(No Model.)
G. H. FOWLER.
ROAD CART.
No. 403,745. Patented May 21 1889.
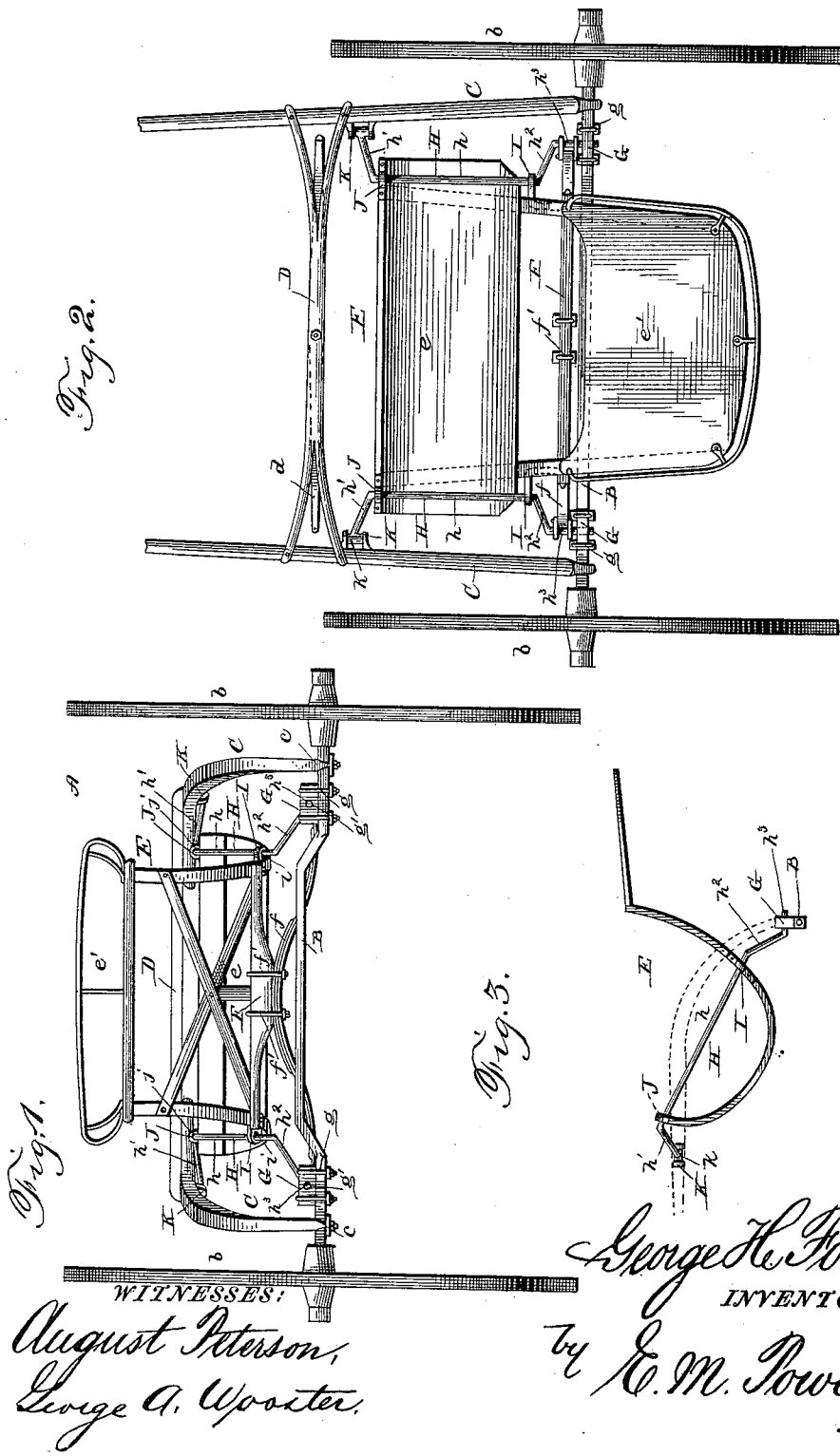
WITNESSES:
August Peterson,
George A. Wooster,
George H. Fowler,
INVENTOR,
by E. M. Power,
Attorney,

UNITED STATES PATENT OFFICE.

GEORGE H. FOWLER, OF TAUGHANNOCK FALLS, NEW YORK.

ROAD-CART.

SPECIFICATION forming part of Letters Patent No. 403,745, dated May 21, 1889.

Application filed February 18, 1889. Serial No. 300,300. (No model.)

*To all whom it may concern:*

Be it known that I, GEORGE H. FOWLER, a citizen of the United States, residing at Taughannock Falls, in the county of Tompkins and State of New York, have invented certain new and useful Improvements in Road-Carts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates to improvements in vehicles, pertaining more particularly to road-carts, the object being to provide means for preventing the imparting of the irregular motion of a horse to a vehicle hitched thereto and for causing the seat to remain horizontal during the rise and fall of the vehicle-body; and it consists in the construction and novel combination of parts hereinafter described, illustrated in the accompanying drawings, and pointed out in the claims hereto appended.

In the accompanying drawings, Figure 1 represents a rear view of my device attached to a vehicle. Fig. 2 is a plan view. Fig. 3 is a side view with the wheels removed.

Referring to the drawings by letter, A designates a road-cart, of which B is the axle; $b$, the wheels; C, the thills connected by the thill-irons $c$ to the axle in the usual manner; D, a brace-bar connecting the rear ends of the thills at the junctions of the thill-irons therewith and bifurcated at its ends, and $d$ a whiffletree pivoted centrally to the center of said brace-bar.

E designates the body of the cart or other vehicle, having the floor $e$, and at its top the seat $e'$, and with its back stayed by cross bars or braces, as shown.

F is a transverse spring-bar secured to the lower part of the back of the seat, and $f$ is a spring having its central part secured to said bar by the clips $f'$, the said spring being, preferably, what is called a "semi-elliptic plate-spring," and having its ends secured to parts hereinafter described.

G G are similar journal boxes or blocks secured by clips $g$ to axle, near each end thereof, to the inner side of the adjacent thill-irons. The said boxes or blocks are provided with bearing-openings $g'$, running from front to rear, about centrally, to receive the rear ends of the supporting crank-rods H, each of which has a central part, $h$, extending longitudinally in relation to the vehicle, and the outwardly-standing arms $h'$ $h^2$, respectively, at the front and rear of the rod, the rear arm, $h^2$, having the rearwardly-bent extension $h^3$, which passes into and is journaled in the opening $g'$ of the corresponding box or block G. The ends of the spring $f$ are looped and engaged on the extensions $h^3$ on the inner side of the boxes G, so that said spring supports the vehicle-body from the crank-rods H.

I I are bearing-irons standing laterally outward from the rear end of the floor of the vehicle-seat on opposite sides, and J J are similar bearing-irons standing upward from the front end of the floor on opposite sides. The bearing-irons I and J are respectively provided with the elongated bearing openings or slots $i$ and $j$, through which pass the longitudinal portions $h$ of the crank-rods H, adjacent to the bends of the arms $h'$ $h^2$, respectively. The end of each of said front arms, $h'$, is T-shaped, or provided with oppositely-standing journals or trunnions $k$, seated in openings in bearing-brackets K, secured by bolts or otherwise to the inner sides of the thills at opposite points. The angles which the arms $h'$ $h^2$ form with the central parts, $h$, of the crank-rods need not be right angles, but are preferably slightly obtuse.

In operation the two crank-rods H act together when the seat and body are depressed under weight, both rods rotating partially for equal distances, so that the seat remains horizontal when the body is either falling or rising. Moreover, the vehicle-body, being hung on said crank-rods and its floor supported by the spring $f$, can swing or oscillate up and down independently of the thills, and receives or has imparted to it very little if any of the up-and-down motion of an attached horse. This renders travel in the vehicle very pleasant and comfortable.

The floor of the vehicle-body may, if desired, be curved from front to rear, so that it will descend below the longitudinal parts $h$ of the crank-rods between the bearing-irons I and J.

Having described my invention, I claim—

1. In a vehicle, the combination, with the axle, thills, and body with seat attached, of the double-armed crank-rods having their central longitudinal portions journaled in bearings attached to the vehicle-body in order to support said body, the ends of their front arms journaled in bearings secured to the thills, and the rearwardly-bent projections of their rear arms journaled in bearings attached to the axle, substantially as specified.

2. In a vehicle, the combination, with the axle, the thills, the vehicle-body, and the bearing-irons I J, secured to said body at suitable points and respectively provided with the bearing-slots $i$ and $j$, of the boxes or blocks G, clipped to the axle at the inner sides of the thill-irons and provided with the bearing-openings $g'$, the bearing-brackets K, secured to the thills on the inner sides thereof, and the crank-rods H, having the central longitudinal parts, $h$, journaled in the slots $i\,j$ of the bearing-irons, the arms $h'$, provided with the journals $k$, mounted in the brackets K, the arms $h^2$, and the rearward projections, $h^3$, journaled in the boxes G, substantially as specified.

3. In a vehicle, the combination, with the axle, the thills, the body, and the bearing-irons I J, secured to the body at proper points, of the bearing-boxes G, secured to the axle, the bearing-brackets K, secured to the thills, the crank-rods H, journaled in the bearing-irons I J and in the boxes G and brackets K, and consisting of the central portion, $h$, the front arm, $h'$, having the journals $k$, and the rear arm, $h^2$, having the extension $h^3$, and the spring $f$, with its ends looped and attached to the extensions $h^3$ and its central part clipped to a spring-bar secured to the back of the vehicle-body, substantially as specified.

In testimony whereof I affix my signature in presence of two witnesses.

GEO. H. FOWLER.

Witnesses:
W. C. RIDDLE,
CHAS. DUMONT.